United States Patent Office 3,099,634
Patented July 30, 1963

3,099,634
EPOXY RESIN-AMINE RICE OIL COMPOSITION AND METHOD OF MAKING SAME
Archibald V. Meigs, Houston, Tex., assignor, by mesne assignments, to Ricco Products Corporation, Houston, Tex., a corporation of Texas, and Rice-Chem Soluplug, Inc., Houston, Tex., a corporation of Texas
No Drawing. Filed Sept. 8, 1960, Ser. No. 54,569
6 Claims. (Cl. 260—18)

This invention relates to a new and improved resinous composition derived from rice oil, and a method of making same.

Surfaces of steel structures, pipes and the like both above ground and underground are highly susceptible to corrosion, and even more so when such structures or pipes are contained in a corrosive atmosphere. Numerous varieties of paints, compositions and other coatings have been used with varying degrees of success.

It is therefore a principal object of this invention to provide a new and improved complex resinous compound and a process for making such compound which provides a tough flexible coating which is alkali, acid and solvent resistant and has excellent corrosion inhibiting properties when applied on either rusted or non-rusted surfaces.

Another object of the present invention is to provide a new and improved resinous composition which is derived from rice oil and a polyfunctional aliphatic amine compound mixed with a polyepoxide resin.

Still another object of the present invention is to provide a new and improved resinous composition derived from rice oil which forms a hard, infusible, solvent resistant compound.

A further object of the present invention is to provide an amino-rice oil compound for curing polyepoxide resin in coating compositions to hard flexible polyepoxide films, impermeable to water, acid and alkali resistant, organic solvent resistant and which films will retain their hardness and strength at relatively high temperatures.

Yet a further object of the present invention is to provide an amino-rice oil compound for curing complex liquid polyepoxide resins without the necessity of adding solvents to obtain a spraying consistency of the polyepoxide-amino-rice oil resinous mixture.

Yet a further object of the present invention is to provide a new and improved epoxy resin-amine rice oil composition which may be used as a structural part of boats, automobiles, and the like.

Yet a further object of the present invention is to provide a new and improved method of making an epoxy resin-amine rice oil composition wherein rice oil is combined with a polyfunctional aliphatic amine and compound and the mixture of both is mixed with a polyepoxide resin to form a hard, infusible, solvent resistant resinous composition.

A still further object of the present invention is to provide a new and improved method of making an epoxy resin-amine composition including the steps of, extracting rice oil from freshly milled rice bran, adding a polyfunctional aliphatic amine compound to the rice oil thereby forming a rice oil amino-resinous composition, and adding a polyepoxide resin to the rice oil amino-resinous composition wherein an epoxy resin-amine composition is formed.

A preferred embodiment of this invention will be described hereinafter, together with other features thereof, and additional objects, features and advantages of the invention will become evident from such description.

The present invention comprises, in substantial amounts, an epoxy resin-amine rice oil composition which is derived by mixing a polyfunctional amine compound with a crude or filtered rice oil, heating and stirring or cooking such mixture, then allowing the compound to cool, and then mixing the resulting polyfunctional amino-rice oil compound with a polyepoxide resin.

In general the products used to make the polyfunctional amino-rice oil compound are crude or filtered rice oil which is preferably obtained from freshly milled rice bran, and a polyfunctional aliphatic amine compound such as diethylene triamine, triethylene tetramine and tetraethylene pentamine.

The crude rice oil used in this invention is normally a by-product of the rice industry. The coating removed from brown rice during milling contains the major part of the germ and most of the outer layer of the kernel together with some broken kernels. The oil is extracted from the freshly milled rice bran with commercial hexane in a manner well known in the art. The method of extracting the rice oil from the freshly milled rice bran does not alter the properties of the rice oil for use in the production of the rice oil amino-resinous composition.

The extracted rice bran oil used in the preparation of the polyfunctional amino-resinous compound of this invention consists of a mixture of glycerides of the unsaturated acids, oleic and linoleic, and the saturated palmitic acid. Small amounts of arachidic, myristic, stearic, lignoceric, and an unsaturated acid $C_{24}H_{48}O_2$ or $C_{26}H_{52}O_2$ are also present. These acids make up 94 to 97.0% of the rice bran oil. The remaining 3.0 to 6.0% is the unsaponifiable matter consisting of phytosterol, dihydrositosterol, stigmasterol and small amounts of myricyl alcohol, ceryl alcohol and squalene.

Rice oil contains potent antioxidants such as $\gamma$ and $\alpha$ tocopherol, and other antioxidants, consequently the rice oil is resistant to oxidative rancidity, and is also a non-drying oil.

The polyepoxide resins suitable for use with the rice oil amino-resinous compound curing agent of this invention comprise those organic compounds possessing at least two reactive epoxy groups

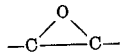

in their molecule. The polyepoxide resin may be saturated or unsaturated, aliphatic, cyclo-aliphatic, aromatic or heterocyclic and may be substituted, if desired, with non-interfering substances. The polyepoxide resin may also be monomeric or polymeric and preferably has a molecular weight between 125 and 3000.

For clarity, many of the polyepoxide resins will be referred to hereinafter in terms of their epoxy equivalency, the term "epoxy equivalency" referring to the number of epoxy groups contained in the average molecular weight of the desired material. The "epoxy equivalency" of any material is determined by a manner well known in the art.

If the polyepoxide material consists of a single compound and all of the epoxy groups are intact, the epoxy equivalency will be integers, such as 2, 3, 4, and the like. However, in the case of polymeric-type polyepoxides many of the materials may contain some of the monomeric monoepoxides or have some of their epoxy groups hydrated or otherwise reacted and/or contain macromolecules of somewhat different molecular weight so the epoxy equivalency may be quite low and contain fractional values. The polymeric material may, for example, have an epoxy equivalency of 1.5, 1.8, 2.5.

The polyepoxides may be exemplified by the following: vinyl cyclohexane dioxide, epoxidized mono-di- and trivinyl glycerides, butadiene dioxide, 1,4-bis(2,3-epoxy propoxy)-benzene, 1,3-bis(2,3-epoxy propoxy)benzene, 4,4-bis(2,3-epoxypropyl)diphenyl ether, 1,8-bis(2,3-epoxy propoxy)-octane, 1,4-bis(2,3 epoxy propoxy)cyclohexane, 4,4'-bis-(2-hydroxy-3,4-epoxybutoxy)diphenyl dimethylmethane, 1,3-bis(4,5-epoxypentoxy)-5-chlorobenzene, 1,4-bis(3,4-epoxybutoxy) 2-chlorocyclohexane diglycidyl thioether, diglycidyl ether, ethylene glycol diglycidyl ether, resorcinol diglycidyl ether, 1,2,5,6-diepoxyhexyne-3, 1,2,5,6-diepoxyhexane and 1,2,3,4-tetra (2-hydroxy-3,4-epoxybutoxy)butane.

Other examples of polyepoxides include the glycidyl polyethers of polyhydric phenols obtained by reacting a polyhydric phenol with an excess (e.g. 4 to 8 mol excess) of a chlorohydrin such as epichlorohydrin and diglycerol chlorohydrin. The polyether, 2,2-bis(2,3-epoxy propoxyphenyl)propane is obtained by reacting bisphenol 2,2-bis-(4-hydroxyphenyl)propane with an excess of epichlorohydrin in an alkaline medium. Other polyhydric phenols that can be used for this purpose include resorcinol, catechol, hydroquinione, methyl resorcinol, or polynuclear phenols, such as 2,2-bis(4-hydroxyphenyl)butane, 4,4-dihydroxybenzophenone, bis 4-hydroxyphenyl ethane, and 1,5-dihydronaphthalene.

Another group of the polyepoxides comprises the polyepoxy poly-ethers obtained by reacting one of the aforedescribed halogen containing epoxides with polyhydric alcohols, preferably in the presence of an acid-acting compound, such as hydrofluoric acid, and subsequently treating the resulting product with an alkaline component. Polyhydric alcohols that may be used for this purpose include glycerol, propylene glycol, ethylene glycol, butylene glycol; diethylene glycol, hexanetriol, sorbitol, mannitol, pentanetriol, pentaerythritol, di- and tri-pentaerythritol, polyglycerol, dulcitol, inositol, methylolpropane, 2,6-octane-diol, 1,2,4,5-tetrahydroxy-cyclohexane, 2-ethyl hexanetriol-1,2,6, glycerol methyl ether, glycerol allyl ether, polyvinyl alcohol and polyallyl alcohol, and mixtures thereof. Such polyepoxides may be exemplified by glycerol triglycidyl ether, mannitol tetraglycidyl ether, pentaerythritol tetraglycidyl ether and sorbital tetraglycidyl ether.

Other polyepoxides include the polyepoxypolyhydroxy to polyethers obtained by reacting preferably in an alkaline medium, a polyhydric alcohol or polyhydric phenol with a polyepoxide such as the reaction production of glycerol and bis(2,3-epoxpropyl)ether, the reaction product of sorbitol and bis(2,3-epoxy-2-methyl propyl)ether, the reaction product of pentaerythritol and 1,2-epoxy-4,5-epoxypentane and the product of bis phenol and bis(2,3-epoxy-2-methyl propyl)ether, the reaction product of resorcinol and bis(2,3-epoxy-propyl)ether and the reaction product of catechol and bis(2,3-epoxypropyl)ether.

A group of polymeric-type polyepoxides comprises the hydroxy substituted polyepoxy polyethers obtained by reacting, preferably in an alkaline medium, a slight excess e.g., 0.5 to 3 mol excess, of a halogen-containing epoxide as described above, with any of the afore-described polyhydric phenols, such as resorcinol, catechol, bis-phenol, bis(4 - (2' - hydroxynaphth-1-yl)2-2hydroxynaphth-1-yl) methane and the like.

Other polymeric polyepoxides include polymers and copolymers of the epoxy-containing monomers possessing at least one polymerizable ethylenic linkage. When this type of monomer is polymerized in the substantial absence of alkaline or acidic catalyst such as in the presence of heat, oxygen, peroxy compounds, actinic light, and the like, they undergo additional polymerization at the multiple bond leaving the epoxy group unaffected. These monomers may be polymerized with themselves or with other ethylenically unsaturated monomers such as styrene, vinyl acetate, methacrylonitrile, acrylonitrile, vinyl chloride, vinylidene chloride, methyl acrylate, methyl acrylate, methyl methacrylate, diallyl phthalate, vinyl allyl phthalate, divinyl allyl phthalate, divinyl adipate, 2-chloroallyl acetate, and vinyl methallyl pimelate. Illustrative examples of these polymers include poly (allyl 2, 3-epoxypropyl ether), poly (2,3-epoxypropyl crotonate), allyl 2,3 epoxypropyl ether-styrene, copolymer, methallyl 3,4-epoxybutyl ether-allyl benzoate copolymer, poly(vinyl 2,3-epoxypropyl)ether, allyl glycidyl ether-vinyl acetate copolymer and poly(4-(2',3'-glycidyloxy)-styrene).

Another group of polyepoxides that may be used with a Rice Oil resinous amine curing agent in polyepoxide coating compositions is the glycidyl ethers of Novolak resins which resins are obtained by condensing an aldehyde with a polyhydric phenol. A typical member of this class is the epoxy resin from formaldehyde 1,2,2-bis(4-hydroxyphenyl)propane Novolak resin which contains as a predominant constituent the substance represented by the formula:

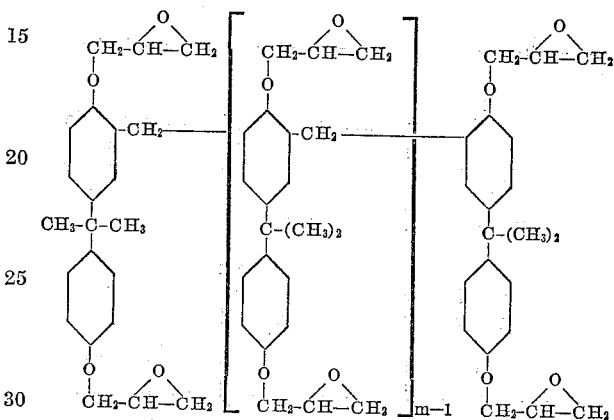

wherein $m$ is a value of at least 1.

These Novolak resin epoxides are obtained by condensing the Novolak resin with at least three moles of epichlorohydrin per phenolic hydroxide equivalent of Novolak resin and then adding about one mole of alkali metal hydroxide per hydroxy-equivalent of Novolak resin.

Other suitable epoxides are the polymers and copolymers of the unsaturated epoxy-containing monomers, such as allyl glycidyl ether. These polymers are preferably prepared by heating the monomer or monomers in bulk or in the presence of an inert solvent such as benzene in the presence of air or a peroxy catalyst, such as ditertiarybutyl peroxide, at temperatures ranging generally from 75° C. to 200° C.

Particularly preferred polyepoxides suitable for use with the rice oil resinous polyamine curing agent of the present invention comprise the glycidyl polyethers of dihydric phenols obtained by reacting epichlorohydrin with polyhydric phenols in an alkaline medium. The monomeric products of this type may be represented by the general formula

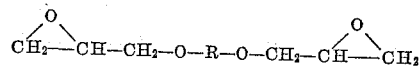

wherein R represents a divalent hydrocarbon radical of dihydric phenol. The polymeric products will generally not be a single simple molecule, but will be a complex mixture of glycidyl polyethers of the general formula

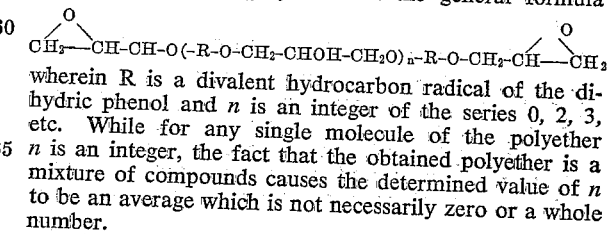

wherein R is a divalent hydrocarbon radical of the dihydric phenol and $n$ is an integer of the series 0, 2, 3, etc. While for any single molecule of the polyether $n$ is an integer, the fact that the obtained polyether is a mixture of compounds causes the determined value of $n$ to be an average which is not necessarily zero or a whole number.

2,2-bis(4-hydroxyphenyl) propane having an epoxy equivalency between 1.1 and 2.0 and a molecular weight of 300–900 is a particularly preferred member of the above group of glycidyl polyethers of the dihydric phenols. Also preferred are those polyepoxides having a Durrans Mercury Method melting point below about 60° C.

Also particularly preferred for mixing with the rice oil polyamine compound are the glycidyl polyethers of polyhydric alcohols which are obtained by reacting the polyhydric alcohol with epichlorohydrin, preferably in the presence of 0.1% to 5% by weight of an acid acting compound, such as boron trifluoride, hydrofluoric acid or stannic chloride. The reaction is effected at about 50-125° C. With the proportion of the reactants being such that there is about one mol of epichlorohydrin for every equivalent of hydroxyl group in the polyhydric alcohol. The resulting chlorohydrin ether is then dehydrochlorinated by heating at about 50° C. to 125° C. with a small (e.g., 10% stoichiometrical) excess of a base, such as sodium aluminate.

The products obtained by the method shown in the preceding paragraph may be described as halogen-containing ether epoxide reaction mixtures and products are polyether polyepoxide reaction products which in general contain at least three non-cyclic ether (—O—) linkages, terminal epoxide-containing ether

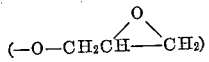

groups and halogen attached to a carbon of an intermediate

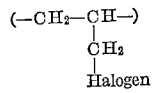

group.

These halogen-containing polyether polyepoxide reaction products, obtainable by partial dehydrohalogenation of polyhalohydrin alcohols may be considered to have the following general formula

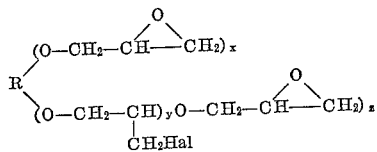

in which R is the residue of the polyhydric alcohol which may contain unreacted hydroxyl groups, x indicates one or more of the epoxy groups attached to the alcohol residue, y may be one or may vary in different reaction products of the reaction mixture from zero to more than one, and z is one or more, and x+z, in the case of products derived from polyhydric alcohols containing three or more hydroxyl groups, averages around two or more than two terminal epoxide groups per molecule.

For the purpose of illustrating the preparation of the epoxy resin-amine rice oil composition of this invention the following examples are given. It is to be understood that the examples are for the purpose of illustration only and the invention is not to be regarded as limited to any of the specific compounds or conditions specified therein:

Example I

A polyfunctional amino-rice oil compound was prepared from filtered rice oil containing 30% free fatty acid having an acid number of approximately 47 and tetraethylene pentamine. The compounds were placed in a reactor vessel in the ratio by weight of 70% rice oil and 30% tetraethylene pentamine. The stirrer was started and the heat was turned on. Under continuous stirring the temperature was brought to 300° F. in one and one-half hours and held at this temperature for one hour. The heat was then increased and raised to 400°–425° F. and held at such temperature for three hours. The reactor vessel was then removed from the heat and the contents allowed to cool to 80° F. before pouring.

The properties of the polyfunctional amino-rice oil compound were:

| | |
|---|---|
| Amine value | 250 |
| Pounds per gallon | 7.93 |
| Specific gravity | .95 |
| Solids, percent weight | 100.0 |
| Viscosity, poises | 42–43 |

The polyfunctional amino-rice oil compound of above was mixed with a polyepoxide resin from bis-phenol A and epichlorohydrin (melting point 25° C. and an epoxy value of 0.35) in the ratio of 35 parts of the amino-rice oil compound to 65 parts of the polyepoxide. The mixture was sprayed onto a metal surface at 70°–80° F. and the mixture air dried to a hard flexible film in 16 to 24 hours.

Example II

In this example, rice oil having 20% free fatty acid and an acid number of 38 was used. 378 grams of tetraethylene pentamine and 100 grams of methyl isobutyl ketone were placed into an opened reactor vessel provided with a variable speed stirrer and a thermometer. The stirrer was started at low speed and the heat was turned on. The temperature of the mixture was slowly raised to 160° F. and held at such temperature for 30 minutes. 782 grams of rice oil were then added and the temperature was raised to 300° F. in one and one-half hours and thereafter held for one hour. The temperature of this mixture was raised to 400° to 425° F. and held at such temperature for three hours and then removed from the heat and allowed to cool.

The resulting polyfunctional amino-rice oil compound was mixed with a polyepoxide resin obtained from bisphenol A and epichlorohydrin (melting point 25° C. and an epoxy value of 0.35) in the ratio of one part by weight of the rice oil compound to two parts by weight of the resin. Such mixture was sprayed onto a metal surface whereon a hard flexible film of high impact resistance and being further resistant to acids, alkali and solvents was obtained in 16 to 24 hours.

Example III

In this example 438 grams of tetraethylene pentamine and 200 grams of methyl iso-butyl ketone were placed into an open cooker. The stirrer was started and the mixture heated slowly to 160° F. and held at such temperature for 30 minutes. Then 882 grams of rice oil having 15% free fatty acid and an acid number of 28 was added to the mixture with continuous stirring. The temperature was raised to 300° F. and held there for one hour. Thereafter the temperature was slowly raised to 400 to 425° F. and held thereabouts for three hours to complete the reaction. The reactor vessel was then removed from the heat and allowed to cool.

The rice oil-amino resinous compound obtained was thoroughly mixed with a commercial polyepoxide resin (Shell Oil Company's Epon 828) in the ratio of one part by weight of polyepoxide resin to one part by weight of the rice oil amino resinous compound and allowed to stand for 30 minutes. The composition was thereafter applied to a rusted and also to a clean metal surface. The film cured at room temperature in 16 to 24 hours to a hard flexible film having excellent impact resistance, and resistance to alkali, acids and solvents. Excellent adhesion was obtained on both the rusted and cleaned surfaces.

The reaction of the polyfunctional amine with the rice oil begins as soon as the polyfunctional amine is added. This is indicated by the increase in temperature and the viscosity of the mixture. Comparable results may be obtained using other amines such as diethylene triamine or triethylene tetramine or the like.

It can be appreciated that the applicant has provided a new and novel composition which preserves the corrosion inhibiting properties of rice oil in addition to forming a tough flexible coating, and the method of making such composition.

Broadly the present invention relates to an epoxy resin-amine rice oil composition and method of producing it.

What is claimed is:

1. A process for preparing a hard infusible resinous polyepoxide composition from rice oil for coating metal surfaces without reacting the constituents in the rice oil which provide corrosion inhibiting and metal surface penetrating properties, which process comprises the steps, in the order named, of:
   (a) forming an intermediate product consisting essentially of a polyfunctional amino compound of rice oil and the constituents in the original rice oil which provide corrosion inhibiting and metal surface penetrating properties by:
      (1) gradually heating a mixture of rice oil and a polyfunctional amine in a vessel while stirring to approximately 300° F. in approximately one hour,
      (2) maintaining the temperature of mixture (1) for approximately one hour,
      (3) thereafter gradually raising the temperature of mixture (1) to approximately 400° F. for approximately three hours,
      (4) maintaining the temperature of mixture (1) at the temperature of (3) above,
   (b) cooling the intermediate product consisting essentially of polyfunctional amino compound of rice oil and said corrosion inhibiting and metal surface penetrating constituents to approximately 80° F.,
   (c) and then mixing said intermediate product with a polyepoxide resin having at least two reactive epoxy groups in each molecule to form a hard infusible product which when initially applied to a metal surface exhibits the corrosion inhibiting and metal surface penetrating characteristics of said rice oil constituents.

2. The process of claim 1 wherein said rice oil is approximately 20% free fatty acid with an acid number of approximately 38, and said polyfunctional amine reacted with said rice oil is tetraethylene pentamine, and said polyepoxide resin which is reacted with said intermediate product is from bis-phenol A and epichlorohydrin having a melting point of approximately 25° C., and an epoxy value of approximately 0.35.

3. The process of claim 2 wherein said rice oil is approximately 15% free fatty acid with an acid number of approximately 28.

4. The process of claim 1 wherein said polyfunctional amine is the product resulting from reacting one mol of tetraethylene pentamine and one mol of methyl isobutyl ketone.

5. The process of claim 4 wherein the polyepoxide resin is from 2,2-bis(4-hydroxyphenol) propane having a melting point of 25° C. and epoxy value of 0.34.

6. The method of claim 4 wherein the polyepoxide resin is from bis-phenol A and epichlorohydrin being liquid at 25° C. and an epoxy value of 0.64.

References Cited in the file of this patent

UNITED STATES PATENTS 2,934,506     Hicks et al. _____ Apr. 26, 1960